Feb. 17, 1931.　　G. POLAKOFF　　1,792,759
TRACKLAYING TRACTOR
Filed Nov. 15, 1926　　4 Sheets-Sheet 1
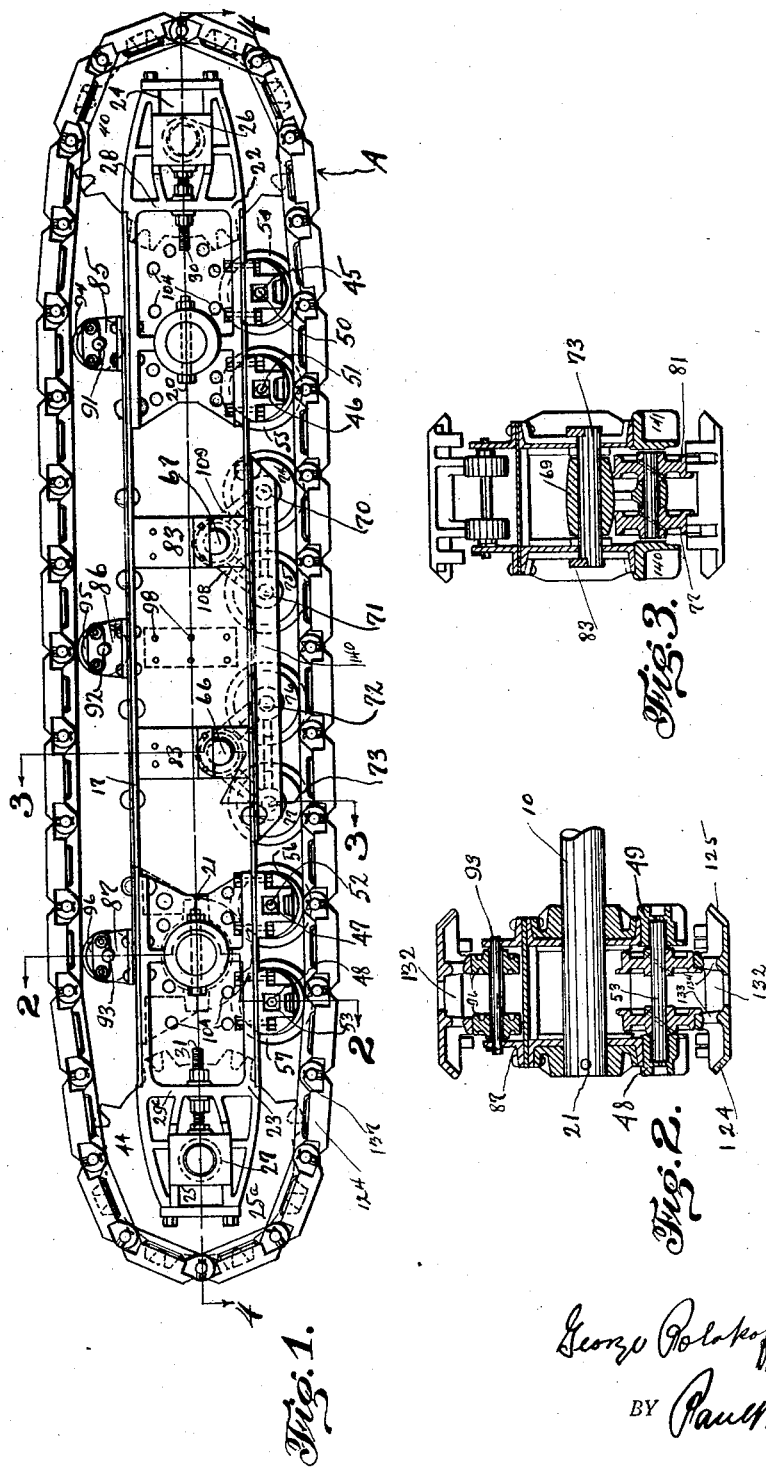
George Polakoff INVENTOR.
BY Paul H Eaton
ATTORNEY.

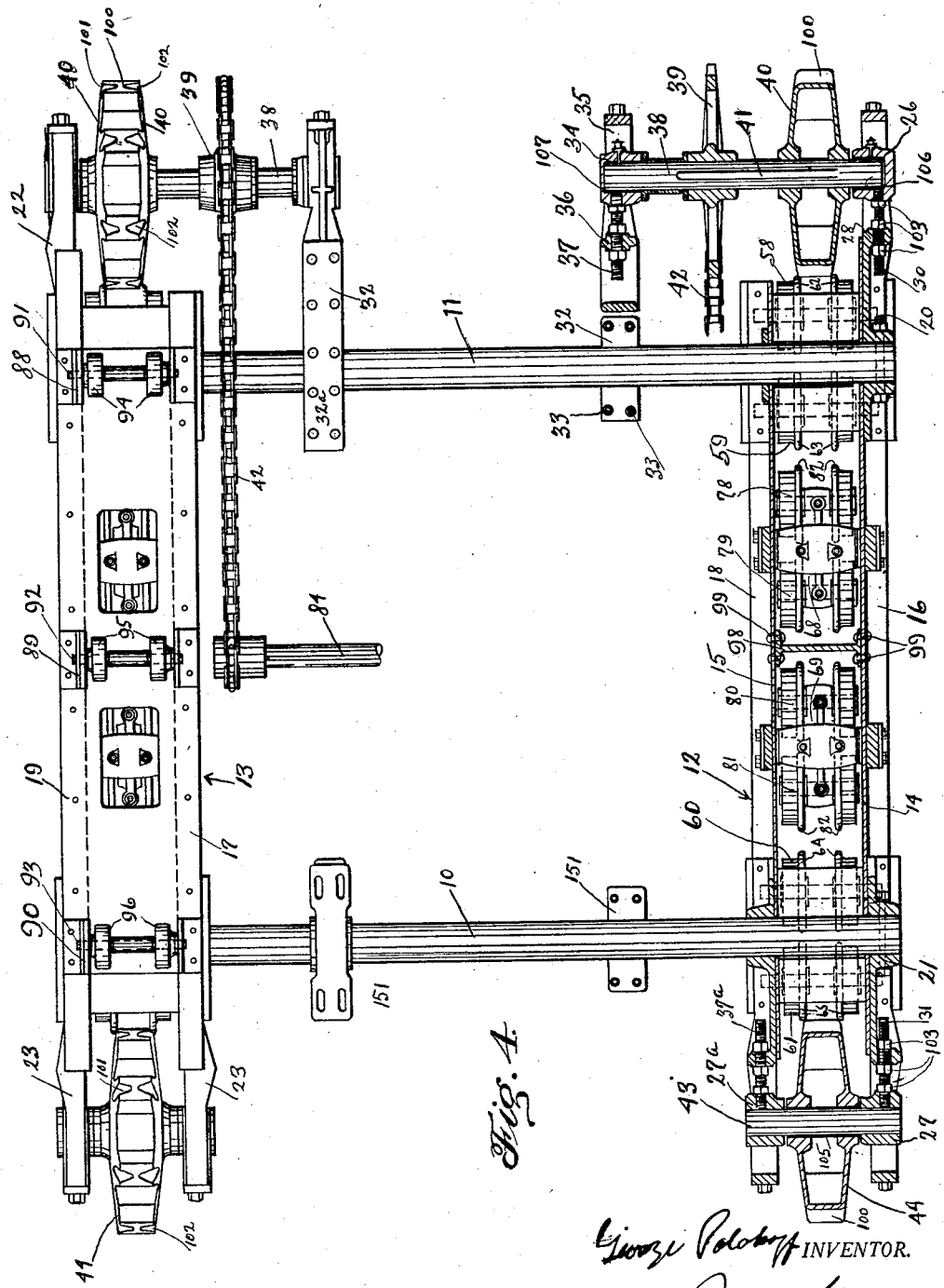

Feb. 17, 1931.　　　G. POLAKOFF　　　1,792,759
TRACKLAYING TRACTOR
Filed Nov. 15, 1926　　　4 Sheets-Sheet 3
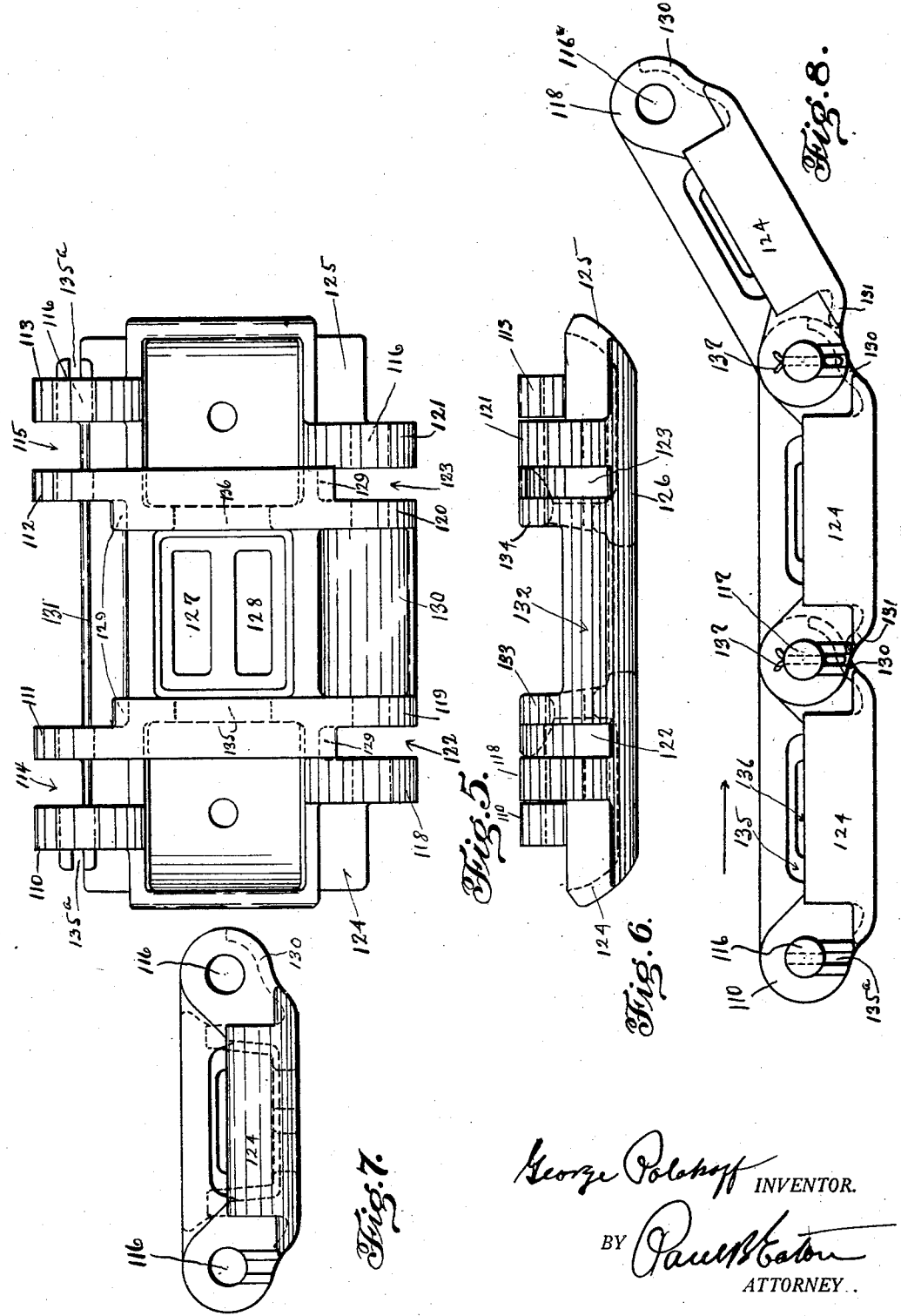

Feb. 17, 1931.  G. POLAKOFF  1,792,759
TRACKLAYING TRACTOR
Filed Nov. 15, 1926  4 Sheets-Sheet 4
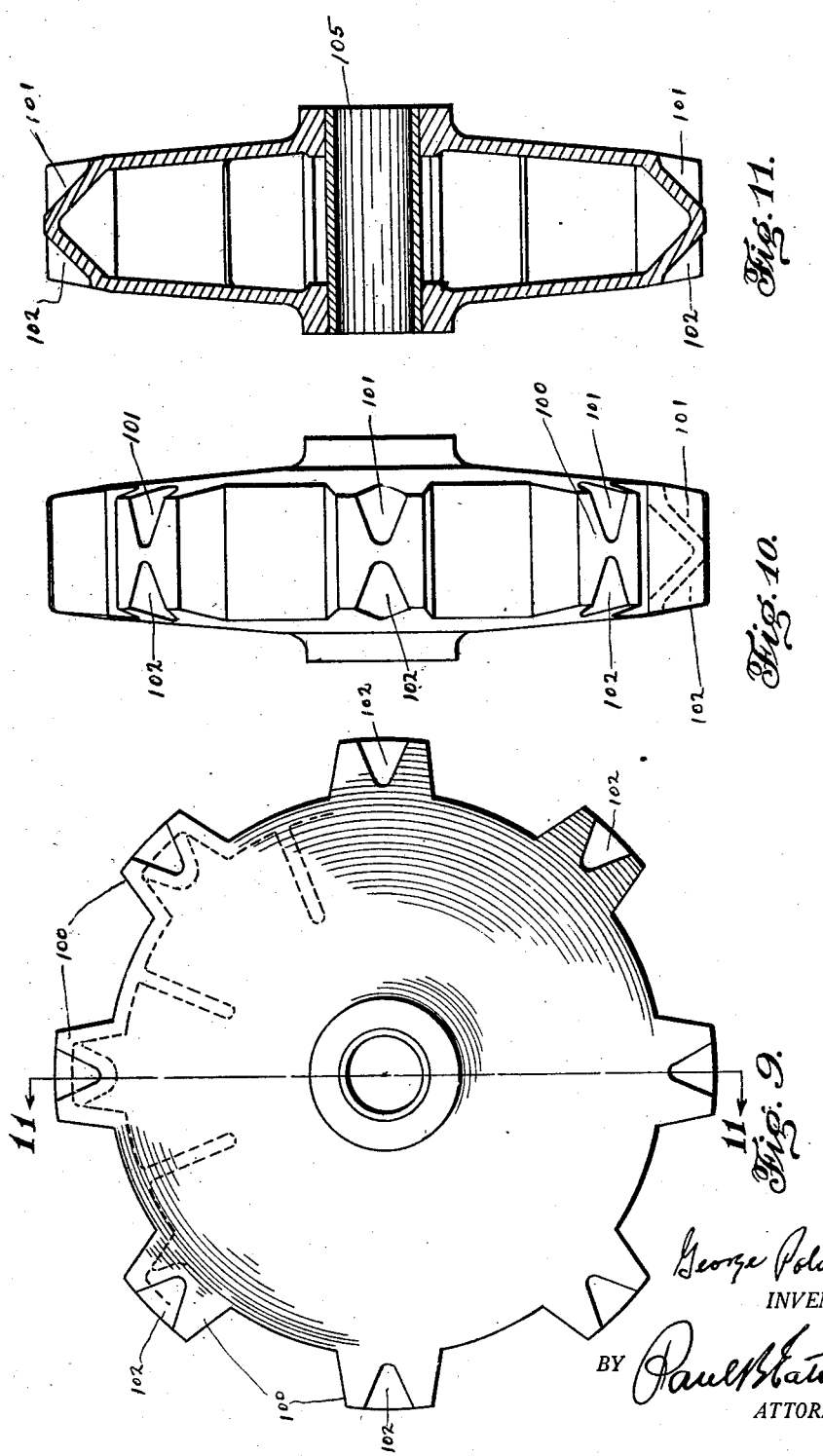

Patented Feb. 17, 1931

1,792,759

UNITED STATES PATENT OFFICE

GEORGE POLAKOFF, OF LOS ANGELES, CALIFORNIA, ASSIGNOR TO C. F. GUTHRIDGE, OF LOS ANGELES, CALIFORNIA

TRACKLAYING TRACTOR

Application filed November 15, 1926. Serial No. 148,590.

My invention relates to improvements in track laying tractors, and more especially to a type wherein the rollers carrying the track are arranged to distribute the weight of the machine carried by the tracks, to improved sprockets for driving the track, and to a special type of tread.

In the specific form of my invention shown in the accompanying drawings, the weight of the machine is carried on thirty-two rollers, where eight forward rollers and eight backward rollers rotate with pins placed in box type stationary bearings, and sixteen center rollers rotate with pins placed in rockers. This feature adds flexibility to the tracks in travelling over rails, rocks and other constructions. The advantage of this arrangement over any track where all of the rollers are carried in rockers is that the distance between the sprockets that drive the treads and the nearest rollers is always constant, preventing treads from getting out of line, thus allowing the rollers to climb their flanges. As soon as the tread passes the front rollers, flexibility is added to it by the center rollers being carried in rockers, as is shown in the drawings.

An object of my invention is to mount the rollers for carrying the track in such a manner as to equalize the weight on the rollers, and to give more flexibility to the track.

Another object of this invention is to provide in a track laying tractor a type of sprocket wheel for driving the track which has the minimum of weight and at the same time has the maximum of strength, and one which is self-climbing.

Another object of this invention is to provide an improved tread for track laying tractor which will have the smoothest running, and which is so constructed as to prevent foreign matter from becoming lodged in the tread, and one in which the tread is so constructed as to permit easy turning.

Another object of this invention is to provide a tread for track laying tractors wherein the track will automatically adjust itself to the contour of the ground over which it passes, and also a track in which the bearings may be adjusted longitudinally to take up wear in the track.

Some of the objects of invention having been stated, other objects will appear as the description proceeds.

I have shown a preferred embodiment of my invention in the accompanying drawings, in which—

Figure 1 is a side elevation of one of my improved track laying tractor;

Figure 2 is a cross-sectional view, taken along the line 2—2 in Figure 1, looking in the direction indicated by the arrows;

Figure 3 is a similar sectional view taken along the line 3—3 in Figure 1, looking in the direction indicated by the arrows;

Figure 4 is a plan view, partially in section, of my complete mechanism, with the sectional portion being taken along the line 4—4 in Figure 1, looking downward;

Figure 5 is a plan view of a link in the track or more specifically, a tread member;

Figure 6 is a side elevation of one of the tread members;

Figure 7 is an elevation of a tread member;

Figure 8 is a side elevation of a portion of the track, showing how the guards close the openings between the tread members;

Figure 9 is a side elevation of one of the driving sprockets;

Figure 10 is a front elevation of one of the sprocket wheels for driving the track members;

Figure 11 is a sectional view of one of the driving sprockets, taken along the line 11—11 in Fig. 9.

Before a detailed description is undertaken, it may be stated that although my track laying tractor tread may operate to propel the machine carried thereby in either direction, ordinarily, treads of this nature have the driving mechanism at the rear, and for purpose of description, I shall refer to the end of my mechanism having the driving means as the rear end, and the opposite end as the front end.

In the drawings, the numerals 10 and 11 indicate the beams which support a machine, such as a dredging machine, steam shovel, or other device which may be carried by my track laying tractor.

On the ends of these members 10 and 11 are secured the members 12 and 13. The members 12 and 13 and associated parts being identical. A description will be given, which will apply to the members 12 and 13 and associated parts. Parts referred to which are not visible in one member will be indicated in the other member.

The members 12 and 13 are composed of parallel spaced members 14 and 15, which have outwardly projecting flanges 16, 17, 18, and 19. The shafts 10 and 11 project through these members 12 and 13 and are rigidly secured thereto by means of bolts 20 and 21.

The members 14 and 15 are secured to each other by having one or more I-beams, such as indicated by 98, secured therebetween and secured to the members 14 and 15 by means of bolts 99.

The outer side member 14 and forward end of member 15 have extensions 22 and 23 which are secured to members 14 and 15 by means of bolts 104, said extensions having longitudinal slots 24 and 25 therein in which the bearing blocks 26 and 27 are adapted to slide. Vertical ribs 28 and 29 appear at the inner ends of the slots and are pierced by adjusting bolts 30 and 31. These adjusting bolts are secured to the bearing blocks 26 and 27 and have adjusting nuts 103, on both sides of the vertical ribs 28 and 29, and also against the bearing blocks.

The forward end of the member 14 has a slot, bearing block, vertical rib, and adjusting bolt identical to the structure heretofore described for the rear end of member 14, and the parts are designated by like members followed by the letter a with the exception that the wheel 44 has a bronze bushing 105, and is adjusted to rotate on the shaft 43, which shaft is fixed by the projecting bolts 37a.

The sprocket wheel 40 does not have any bushing, but is securely fastened to the shaft 38, and said shaft rotates in the bushings 106 and 107.

One end of the member 15 does not have the slot, bearing block and associated parts, but such parts are provided in the member 32. This member 32 is secured to the shaft 11 by any suitable means such as the clamping bolts 33, and has the journal bearing block 34, mounted in a horizontally disposed slot 35, similar to the slot 24, in the member 22, and to the rear of the slot 35 is the vertical rib 36, similar to vertical rib 28, and the adjusting bolt 37 pierces this rib 36 in the same manner as the bolt 30 pierces 28. The upper face 32a of member 32 is flat and is adapted to be secured to the framework of the machine, such as a dredge, which is carried by the track mechanism. The member 10 has brackets 151 and which have a flat upper surface and are also adapted to be secured to the framework of the machine.

Rotatably mounted in the bearing blocks 26 and 34 is the shaft 38 and rigidly secured to this shaft in spaced relation are the sprocket wheels 39 and 40, which are secured to the shaft 38 by means of a key 41.

The sprocket wheel 39 has a sprocket chain 42 thereon which is adapted to be mounted on a sprocket wheel on a prime mover (not shown).

The forward ends of the members 14 and 15, as shown in Figures 1 and 2, having the slots and bearing boxes, previously described, also have the shaft 43 fixedly mounted in the bearing blocks 27 and 27a, and rotatably mounted on this shaft 43, is the sprocket wheel 44.

On the lower face of the flange 16, there is secured the journal bearings 45, 46, 47, and 48, and corresponding bearings are located on the lower face of the flange 18, one of these bearings being designated by the numeral 49 in Figure 2.

Rotatably mounted in these journal bearings are the pins 50, 51, 52, 53, and fixedly secured to these pins are the wheels 54, 55, 56, 57, 58, 59, 60, and 61, which wheels have peripheral flanges 62, 63, 64, and 65 on their inner edges.

In the central portion of the member 12 and to the side wall portions 14 and 15, the bearing shafts 66 and 67 are secured and held firmly in place against rotation by the members 83. On these shafts are loosely mounted the rocker arms 68 and 69, which are inverted V-shaped and have the bearing for engagement with the shafts 66 and 67 located through their apices and in the ends of each of the prongs 108 and 109 of the inverted V-shaped rocker arms are rotatably mounted the shafts 70, 71, 72, and 73, and on the ends of these shafts are fixedly mounted the wheels 74, 75, 76, 77, 78, 79, 80, and 81, which have peripheral radial flanges, such as indicated at 82 on their inner edges.

On the upper face of the flanges 17 and 19, are the projections 85, 86, 87, 88, 89, and 90, which have pins 91, 92, and 93 rotatably mounted therein, and fixedly secured on these pins are the pairs of wheels 94, 95, and 96, for supporting the track.

The sprocket wheels 40 and 44, which are adapted to carry the track, which will be later described, are mounted in the ends of the framework, as previously described, and are of special hollow type and are designed for the purpose of being light in weight with the maximum of strength. This design allows the sprocket to be absolutely self-climbing as the outside walls of it are flat without any ribs projecting over the surface, or any light holes or spokes. The teeth 100 of the sprockets are under the same self-climbing class, being very strong in construction, simple in form and wide, having triangular grooves 101 and 102 on each side, the purpose of which will be later explained.

Having described the framework on which my treads are mounted, I shall proceed to describe the track tread members making up the same.

Each tread member has longitudinal projections 110, 111, 112, and 113, on one end thereof, leaving an opening 114 between the projections 110 and 111 and another opening 115 between the projections 112 and 113. All of these projections have a hole therethrough at right angles, through which a pin 117 is adapted to be inserted. The other end of the tread member has projections 118, 119, 120, and 121 which are similar to the projections on the other end of the tread member, but are so positioned as to leave spaces 122 and 123 in which the projections 111 and 112 on the preceding tread member are adapted to fit, and the projections 118 and 121 are adapted to fit into the spaces 114 and 115 on the preceding tread member. All of these projections have holes 116 therethrough in which pins 117 are adapted to be inserted to firmly hold the tread members together to form the track.

The sides of the tread members have upturned portions 124 and 125 and a flat face portion 126. Near the center of the face portion there are holes 127 and 128.

The end portions 130 and 131 of the face portion 126 are curved, the portion 130 being an irregular curve, ranging upwardly and then broadening its arc and assuming a curve with the center of the pin 117 as its radius.

In Figure 8 I have shown a side view of a section of my track which is designated by the letter A in Figure 1, and assuming that the whole device is progressing to the right in Figure 1, it is seen that the guard 130 is at the front end of the treads and that the guard 131 is at the rear end of the treads.

These guards 130 and 131 prevent the mud, dirt, stones and other foreign substances from reaching the bolts 117 and the mechanism on the inside of the track.

Near the center of each tread member is the cavity 132 (see Figure 2) which is adapted to receive one of the sprockets 100 on the sprocket wheels 40 and 44. The side walls of these cavities are formed by the ribs 133 and 134, and piercing these sidewalls are the perforations 135 and 136. When one of the sprockets 100 enters the cavity 132, any foreign substance such as mud, will be forced out through the holes 127, 128, 135, and 136. The triangular shaped cavities 101 and 102 meshing with the cavities in the tread members. The ribs 133 and 134 serve as track members on which the wheels 54, 55, 56, 57, 74, 75, 76, 77, 78, 79, 80, 81, 94, 95, and 96 run. The flanges on the inner edges of said lower wheels fitting against the inner walls of the ribs 133 and 134.

The tread shoes are designed to obtain the smoothest running results and are self-climbing also with a large number of shearing joints to increase the pulling strength through the shoes. The ribs 133 and 134 act as rails for rollers to travel on. They are made in such a manner that the front end of link of one shoe projects into the front end of inside link of the other shoe, as indicated at 129, which forms a continuous rail for rollers to travel on without jumping. To obtain a greater pulling strength there are outside links of wider bearing area.

The forward end of each tread member has a slot 135a cast integral therewith in which the cotter pin 137 is held and thus prevents relative rotation between the pin 117 and the forward end of the tread member.

The sprocket chains 42 are secured to separate drive shafts such as 84, which are driven from a prime mover on the framework, carried by the track mechanism, the shafts 38 being capable of being driven at different speeds for purposes of steering the machine.

Having thus described a preferred embodiment of my invention, I desire it to be understood that although specific terms are employed, they are used in a generic and descriptive sense, and not for purposes of limitation, the scope of the invention being set forth in the appended claim.

I claim:

In a self propelled vehicle, a framework on each side thereof, shafts connecting the frameworks to each other, said shafts having fastening means thereon adapted to support a machine having a prime mover, each framework being composed of longitudinal spaced members, a longitudinally adjustable shaft mounted in the forward end of each framework, a sprocket wheel rotatably mounted on each adjustable shaft, a longitudinally adjustable journal bearing located in the rear end of each outer longitudinal member, a pair of longitudinally adjustable bearings mounted on the rear of the rear shaft connecting the frameworks together, rotatable shafts mounted in the last named bearings, and those on the rear ends of the outer longitudinal members, a sprocket wheel mounted on each of the last named rotatable shafts, driving means connected to the last named rotatable shafts, endless track members mounted on the sprocket wheels and rollers in the frameworks for supporting and carrying said endless tracks.

In testimony whereof I affix my signature.

GEORGE POLAKOFF.